Nov. 13, 1928.

K. TANK ET AL 1,691,593

AIRCRAFT WITH PUSHER SCREW

Filed Feb. 17, 1927

Patented Nov. 13, 1928.

1,691,593

UNITED STATES PATENT OFFICE.

KURT TANK, OF POTSDAM, NEAR BERLIN, AND KARL FRYDAG, OF SCHMARGENDORF, NEAR BERLIN, GERMANY, ASSIGNORS TO THE FIRM: ROHRBACH METALL-FLUGZEUGBAU, G. M. B. H., OF BERLIN, GERMANY.

AIRCRAFT WITH PUSHER SCREW.

Application filed February 17, 1927, Serial No. 168,885, and in Germany January 20, 1926.

The invention relates to aircraft and particularly to a power plant of the pusher screw type therefor.

Air cooled engines of the stationary cylinder type which are now being extensively used in aeronautical power plants can be employed without difficulty in connection with tractor screws, since even at low speeds they are adequately cooled by the propeller blasts. The conditions are different, however, in pressure or pusher screw power plants wherein very little, if any, advantage can be taken of the propeller suction effect. The difficulties are increased if the craft is moving along slowly as when for instance, seaplanes are taxying on the water. Therefore in pusher screw power plants wherein the engine and screw are located one after the other on substantially the same axis, only water cooled engines have been mainly employed. The power plants embodying such water cooled engines do not differ substantially from the usual arrangement in which the engine is mounted in a nacelle or fuselage and is provided with a radiator which is located directly behind the separated engine room, being ordinarily situated a substantial distance from the rear end of the nacelle.

The object of the invention is a special construction and arrangement of power plant for aircraft enabling the use of air cooled engines of the stationary type with pusher screws. To this end the invention consists in that the stationary air cooled engine is arranged in the rear part of the engine nacelle quite close to and in front of the pusher screw and substantially on the same axis, and the cooling of the engine is solely by the air. The objections of the water cooling with its accompanying leaky pipes and radiator channels are thereby avoided and the exclusive air cooling enables the effective arrangement of channels of sufficient internal diameter and the proper course from the standpoint of cooling efficiency, and the pure air cooling is particularly effective because sufficiently large air volumes and pressures may be produced and utilized and transmitted with the least possible losses due to friction and applied to the cylinders to be cooled.

By my invention I obtain the benefits of the combined advantages of the pusher screw from an aerodynamical standpoint and the air cooled engine from an economical and safety standpoint.

Moreover, by my invention I am enabled to arrange the engine directly in front of the pusher screw and substantially axially therewith and still obtain effective air cooling for the engine, notwithstanding the suction effect of the screw is particularly small with this arrangement, and in a particularly simple, effective and economical manner.

For a better understanding of the invention, reference may be had to the accompanying drawings showing three embodiments of the invention, wherein—

Figure 1:
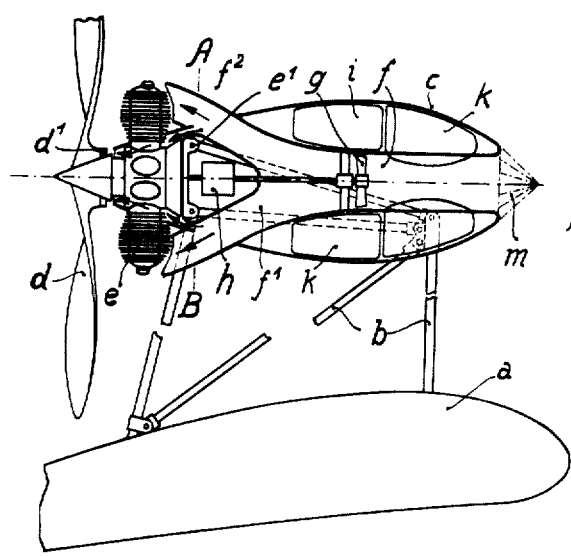
Fig. 1 is a vertical central section through an engine nacelle, wherein the pusher screw is coupled with a radial motor.
Figure 2:
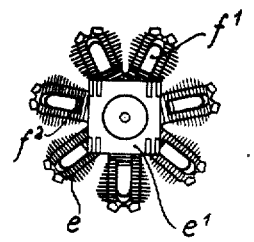
Fig. 2 is a section along the line A—B of Fig. 1.

According to Fig. 1 the invention is indicated as embodied in an aircraft of the aeroplane type but it is understood that it is applicable to other types. An aircraft is indicated having a lifting wing $a$. Extending well above this wing struts $b$ are arranged for supporting an engine nacelle $c$, which, at its rear end, carries a pusher screw $d$. Directly in front of this screw, i. e. with short intermediate shaft piece, a radial engine $e$ is arranged for driving well above this, the cylinders of which partly project from the streamlined casing of the nacelle $c$. The engine is stationary and mounted on a plate $e^1$, which is supported by struts $b$. A passage $f$, running from the nose of the nacelle to its rear part, where it divides into several branches $f^1$ delivering to the cylinders, is provided. The outlets of those branches cover only part of the cylinder breadth, as shown in Fig. 2. By means of these passages air is directed and delivered on to the cylinders. A fan $g$, driven by the engine $e$, is so arranged inside the passage, that the fan-shaft is coupled with the engine shaft, through an intermediary change speed gear $h$.

By-passages $f^2$ lead from the branches $f^1$ to the cylinder bases. The cooling air flowing through those by-passages escapes at the end of the nacelle, concentric to screw boss, fan blades $d^1$ being on the boss to relieve the flowing off.

A petrol gravity tank is represented at $i$. $k$ designates oil tanks, the outer panels of which, being formed by the walls of the passage $f$, serve as heat exchange members. They can be specially adapted to the purpose by providing them with cooling ribs or tubes, so arranged as to project into the passage proper. A covering device $m$ is provided at the passage entrance, allowing to shut the passage off either partly or completely.

During flight the cooling effect of the air current round the nacelle, sweeping past the uncovered parts of the cylinders, is quite satisfactory, so that the compulsory cooling can be shut off by means of the covering device $m$.

When the engine is running on the test bed or with a rather slow flying speed of the machine, same rolling, for instance, on the sea, the automatic cooling is relieved or replaced by the compulsory one, or special arrangement shown for delivering sufficient quantities of air to the cylinders through the branches $f^1$, by means of the fan $g$. The air flowing through the passage has a satisfactory cooling effect upon the lubricating oil circulating in the tanks $k$. Reference has been made above to the cooling of the cylinder bases by air flow through by-passages.

Figure 3:
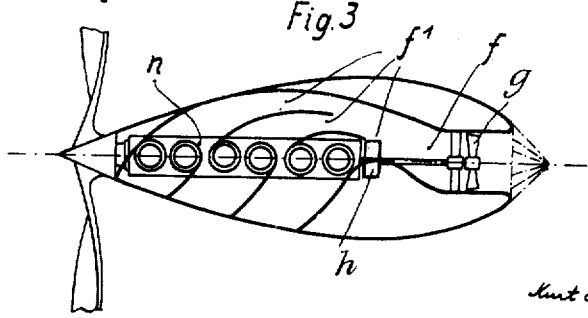
Fig. 3 shows a horizontal central section through a nacelle with serial engine.

The constructional form according to Fig. 3 shows the branches $f^1$ of the air passage $f$ provided inside the engine nacelle, leading laterally and vertically towards the cylinders of a serial engine $n$. This means a simplification of design inasmuch as only one branch is provided for every two cylinders. In order to efficiently relieve the air flow, outlet passages have been arranged at the turned off side of the cylinders, sucking off the air during flight.

Figure 4:
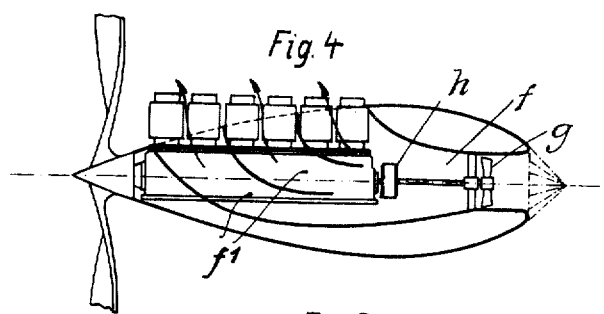
Fig. 4 represents the vertical central section through another nacelle with serial engine.

Another arrangement of the air cooling with serial engines is shown in Fig. 4, wherein the branches $f^1$ are carried to the cylinder bases, so that their outlets run more or less parallel to the cylinder axles. The air is perfectly free to escape at the cylinder heads. The last two forms of construction provide for a covering cowling and fan blades, driven, in a given case, by the engine through an intermediary change speed gear.

After having thus described the nature of our invention and the manner in which same has to be performed, we declare that what we claim is:

1. In a power plant for aircraft an engine nacelle as an independent unit, a stationary air cooled engine located in the rear of the nacelle and having its axis arranged in the direction of flight, a pusher screw driven by said engine and disposed closely behind the same, the engine being located within the cylinder of revolution defined by the rotating pusher screw tip and means disposed in the fore part of the nacelle functioning independently of said pusher screw for inducing and introducing a cooling blast of air into said nacelle, causing the same to flow substantially in the direction of flight therethrough without sharp or pronounced deviations and supplying the same to said engine.

2. In a power plant for aircraft of the character set forth in claim 1 wherein the engine and the pusher screw are arranged substantially on the same axis.

3. In a power plant for aircraft an engine nacelle, a stationary air cooled engine located in the rear of the nacelle, a pusher screw driven by said engine and disposed closely behind the same, the engine being located within the cylinder of revolution defined by the rotating pusher screw tip and means functioning independently of said pusher screw for inducing and introducing a cooling blast of air and supplying the same to said engine, said means comprising a longitudinal channel in the fore part of the nacelle having sufficient dimensions to accommodate the total volume of air needed for the artificial cooling of the engine and sub-divided rearwardly into branch channels, said branch channels leading directly to the engine cylinders.

4. In a power plant for aircraft an engine nacelle, a stationary air cooled engine located in the rear of the nacelle, a pusher screw driven by said engine and disposed closely behind the same, the engine being located within the cylinder of revolution defined by the rotating pusher screw tip and means functioning independently of said pusher screw for inducing and introducing a cooling blast of air and supplying the same to said engine, said means comprising a longitudinal channel in the fore part of the nacelle having sufficient dimensions to accommodate the total volume of air needed for the artificial cooling of the engine and sub-divided rearwardly into branch channels, said branch channels leading directly to the engine cylinders and a power driven fan disposed in the longitudinal channel in advance of the branch channels.

5. In a power plant for aircraft an engine nacelle, a stationary air cooled engine located in the rear of the nacelle, a pusher screw driven by said engine and disposed closely behind the same, the engine being located within the cylinder of revolution defined by the rotating pusher screw tip and means functioning independently of said pusher screw for inducing and introducing a cooling blast of air and supplying the same to said engine, said means comprising a longitudinal channel in the fore part of the nacelle having sufficient dimensions to accommodate the total volume of air needed for the artificial cooling of the engine and extending rearwardly into branch channels, said branch channels leading directly to the engine cylinders and a power driven fan disposed in the longitudinal channel in advance of the branch channels, said fan being driven by the engine and a gearing disposed between the engine and the fan for running the fan at a higher speed than the engine.

6. In a power plant for aircraft, an engine nacelle, a stationary radial engine of the air cooled type disposed in the rear part of said nacelle, artificial means for introducing a cooling blast of air for the engine, a pusher screw driven by the engine and arranged behind the same and mounted substantially on the same axis, said nacelle being provided with a longitudinal channel in front of the engine, said channel at its rearmost end being sub-divided into single branch channels leading directly to the engine cylinders, the branch channels terminating adjacent the cylinders in such a breadth that the cylinders are only partly covered in the fore and aft direction.

7. In a power plant for aircraft according to claim 6 including auxiliary branch channels leading to the feet of the cylinders of the radial engine.

8. In a power plant for aircraft of the character set forth in claim 6 wherein auxiliary branch channels are provided in the nacelle leading from the first named branch channels to the feet of the cylinders of the radial engine.

9. In a power plant of the character set forth in claim 6 wherein the auxiliary branch channels lead to the feet of the cylinders and a fan is provided in advance of the intakes of the branch channels.

10. In a power plant of the character set forth in claim 6 wherein a bearing for the radial engine is disposed within the cone-shaped space formed by the branches which lead to the cylinders.

11. In a power plant for aircraft, an engine nacelle, a stationary air cooled engine mounted in the rear part of said nacelle, means for creating and introducing an air cooling blast for said engine, a pusher screw driven by said engine and disposed closely behind the same, said nacelle being provided with a longitudinal channel in advance of the engine of sufficient dimensions to accommodate the total volume of air required for the artificial cooling, said longitudinal channel being branched off into single part channels leading to the engine cylinders, and surrounded by containers, said containers containing fuel or oil for the engine and the channel wall serving as a heat exchanging means therefor.

12. In a power plant of the character set forth in claim 11 wherein the channel walls are provided with ribs projecting into the channel which serve as heat exchanging bodies.

13. In a power plant for aircraft, an engine nacelle, a stationary radial engine of the air cooled type disposed in the rear part of said nacelle, artificial means for introducing a cooling blast of air for the engine, a pusher screw driven by the engine and arranged behind the same, said nacelle being provided with a longitudinal channel in front of the engine, said channel being provided with single branch channels leading directly to the engine cylinders, the branch channels terminating adjacent the cylinders in such a breadth that the cylinders are only partly covered in the fore and aft direction.

14. In a power plant for aircraft, an engine nacelle, a stationary air-cooled engine located in the rear of the nacelle, a pusher screw driven by said engine, and means functioning independently of the said pusher screw for inducing and introducing a cooling blast of air into said nacelle and distributing the same to said engine, said means comprising a longitudinal channel in the fore part of the nacelle having sufficient dimensions to accommodate the total volume of air needed for the artificial cooling of the engine and leading rearwardly into branch channels, said branch channels leading directly to the engine cylinders.

In testimony whereof, we have signed our names to this specification.

KURT TANK.
KARL FRYDAG.

CERTIFICATE OF CORRECTION.

Patent No. 1,691,593.  Granted November 13, 1928, to

KURT TANK ET AL.

It is hereby certified that error appears in the printed specification of the above numbered patent requiring correction as follows: Page 1, line 87, strike out the words "well above this" and insert instead "the screw"; and that the said Letters Patent should be read with this correction therein that the same may conform to the record of the case in the Patent Office.

Signed and sealed this 8th day of January, A. D. 1929.

(Seal)

M. J. Moore,
Acting Commissioner of Patents.

inders and a power driven fan disposed in the longitudinal channel in advance of the branch channels, said fan being driven by the engine and a gearing disposed between the engine and the fan for running the fan at a higher speed than the engine.

6. In a power plant for aircraft, an engine nacelle, a stationary radial engine of the air cooled type disposed in the rear part of said nacelle, artificial means for introducing a cooling blast of air for the engine, a pusher screw driven by the engine and arranged behind the same and mounted substantially on the same axis, said nacelle being provided with a longitudinal channel in front of the engine, said channel at its rearmost end being sub-divided into single branch channels leading directly to the engine cylinders, the branch channels terminating adjacent the cylinders in such a breadth that the cylinders are only partly covered in the fore and aft direction.

7. In a power plant for aircraft according to claim 6 including auxiliary branch channels leading to the feet of the cylinders of the radial engine.

8. In a power plant for aircraft of the character set forth in claim 6 wherein auxiliary branch channels are provided in the nacelle leading from the first named branch channels to the feet of the cylinders of the radial engine.

9. In a power plant of the character set forth in claim 6 wherein the auxiliary branch channels lead to the feet of the cylinders and a fan is provided in advance of the intakes of the branch channels.

10. In a power plant of the character set forth in claim 6 wherein a bearing for the radial engine is disposed within the cone-shaped space formed by the branches which lead to the cylinders.

11. In a power plant for aircraft, an engine nacelle, a stationary air cooled engine mounted in the rear part of said nacelle, means for creating and introducing an air cooling blast for said engine, a pusher screw driven by said engine and disposed closely behind the same, said nacelle being provided with a longitudinal channel in advance of the engine of sufficient dimensions to accommodate the total volume of air required for the artificial cooling, said longitudinal channel being branched off into single part channels leading to the engine cylinders, and surrounded by containers, said containers containing fuel or oil for the engine and the channel wall serving as a heat exchanging means therefor.

12. In a power plant of the character set forth in claim 11 wherein the channel walls are provided with ribs projecting into the channel which serve as heat exchanging bodies.

13. In a power plant for aircraft, an engine nacelle, a stationary radial engine of the air cooled type disposed in the rear part of said nacelle, artificial means for introducing a cooling blast of air for the engine, a pusher screw driven by the engine and arranged behind the same, said nacelle being provided with a longitudinal channel in front of the engine, said channel being provided with single branch channels leading directly to the engine cylinders, the branch channels terminating adjacent the cylinders in such a breadth that the cylinders are only partly covered in the fore and aft direction.

14. In a power plant for aircraft, an engine nacelle, a stationary air-cooled engine located in the rear of the nacelle, a pusher screw driven by said engine, and means functioning independently of the said pusher screw for inducing and introducing a cooling blast of air into said nacelle and distributing the same to said engine, said means comprising a longitudinal channel in the fore part of the nacelle having sufficient dimensions to accommodate the total volume of air needed for the artificial cooling of the engine and leading rearwardly into branch channels, said branch channels leading directly to the engine cylinders.

In testimony whereof, we have signed our names to this specification.

KURT TANK.
KARL FRYDAG.

CERTIFICATE OF CORRECTION.

Patent No. 1,691,593.        Granted November 13, 1928, to

KURT TANK ET AL.

It is hereby certified that error appears in the printed specification of the above numbered patent requiring correction as follows: Page 1, line 87, strike out the words "well above this" and insert instead "the screw"; and that the said Letters Patent should be read with this correction therein that the same may conform to the record of the case in the Patent Office.

Signed and sealed this 8th day of January, A. D. 1929.

(Seal)               M. J. Moore,
                Acting Commissioner of Patents.